(No Model.)
C. H. WARRINGTON.
Road Engine.
No. 235,051. Patented Nov. 30, 1880.
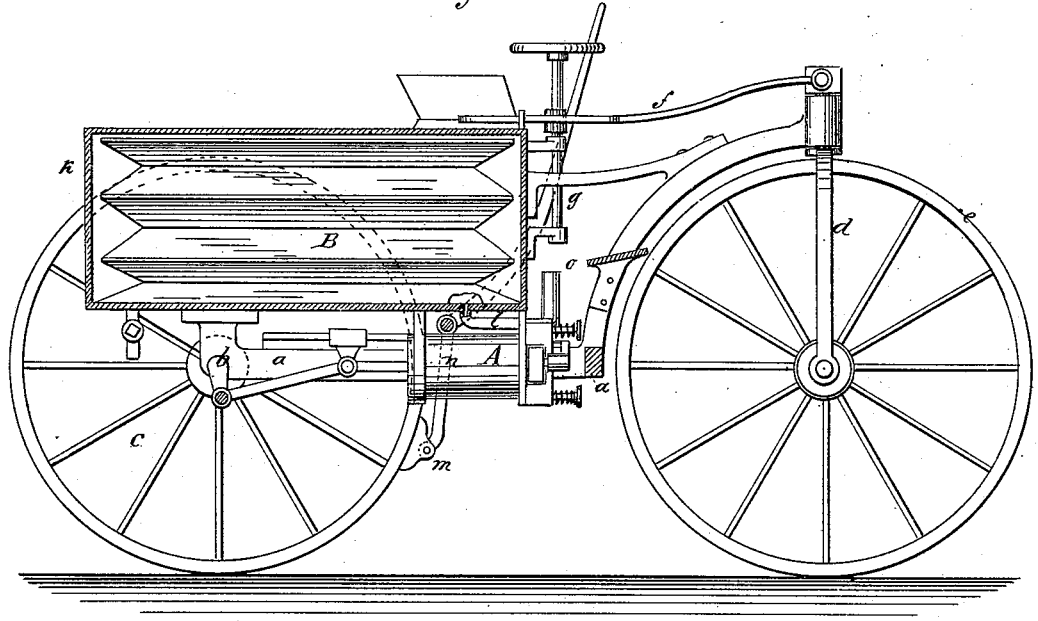
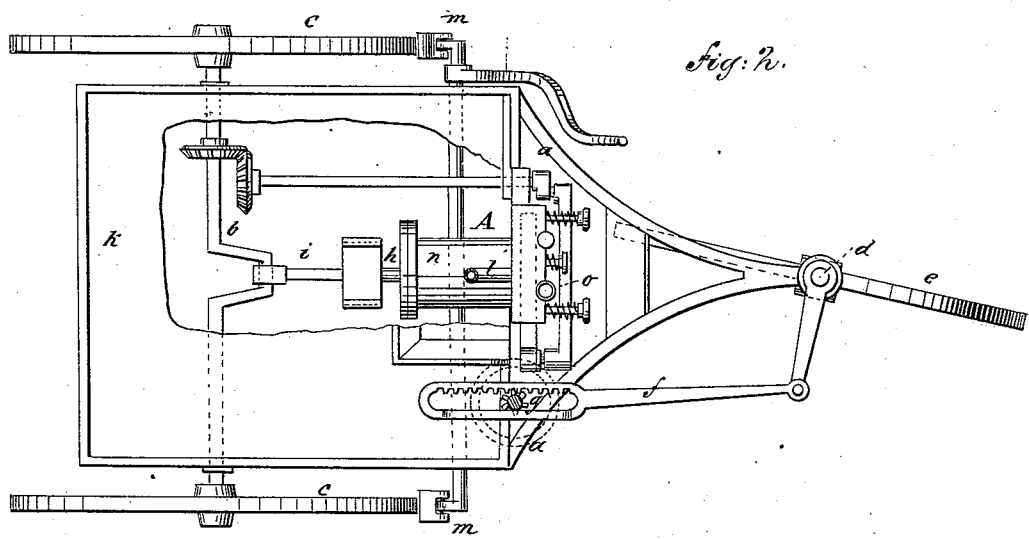
WITNESSES:
INVENTOR:
C. H. Warrington
BY
ATTORNEYS.

UNITED STATES PATENT OFFICE.

CURTIS H. WARRINGTON, OF WEST CHESTER, PENNSYLVANIA.

ROAD-ENGINE.

SPECIFICATION forming part of Letters Patent No. 235,051, dated November 30, 1880.

Application filed October 14, 1880. (No model.)

*To all whom it may concern:*

Be it known that I, CURTIS H. WARRINGTON, of West Chester, Chester county, Pennsylvania, have invented a new and useful Improvement in Road-Vehicles, of which the following is a specification.

The object of my invention is to furnish a light and convenient road-vehicle driven by power. For this purpose I fit a vehicle of suitable construction with a gas-engine and with a reservoir for gas of capacity sufficient for several hours' run. Such engines being light, and requiring no heavy fuel nor boiler, are especially adapted for the use named, and by this combination I obtain a vehicle suitable for general use on common roads.

In the accompanying drawings, Figure 1 is a sectional side elevation of the road-vehicle, and Fig. 2 is a plan view of the same with the gas-reservoir removed and the bottom board broken open.

Similar letters of reference indicate corresponding parts.

The frame of the vehicle may be of any suitable construction. As shown, *a a* are side reaches upon a rear axle, *b*, and wheels *c*, which reaches extend forward to receive the pivoted and forked post *d*, that carries the forward wheel, *e*.

On the upper end of post *d* is fitted an arm, from which a rod, *f*, carrying a rack, extends to and is connected with a pinion on a shaft, *g*, which shaft is suitably sustained and is provided with a hand-wheel. This construction enables the driver to readily change the direction of the vehicle and hold it steady.

A is the gas-engine, sustained between the side reaches, *a*, in any suitable manner. The engine is the ordinary gas-engine, such as is well known.

*n* is the cylinder; *o*, the smoke-pipe. *h* is the piston-rod, and *i* the connecting-rod passing to a crank provided on the rear axle, *b*.

B is the reservoir for gas fitted within a suitable frame or box, K, that is sustained on the reaches *a* and above the engine. The reservoir may be of sheet metal, and in the form of bellows, or as a bag, of a size for containing gas sufficient for a short run—say of two hours. The bag or reservoir will be suitably weighted to obtain the required pressure and force the gas out.

From the reservoir a pipe, *l*, passes directly to the cylinder of the engine. The usual governor and valve mechanism are to be omitted, and pipe *l*, fitted with a cock, placed in convenient position for operation by the driver.

I prefer to make the vehicle with high wheels similar to velocipede-wheels, and connect the piston-rod of the engine to the axle by a crank, as long as may be. I do not, however, limit myself in this particular nor in other details of construction.

This combination furnishes a light and effective self-propelling road-vehicle. The engine can be started in a moment, and requires no skilled engineer for its operation, and the vehicle can be run fast or slow, as desired, by simply varying the gas-supply. The gas can be renewed, from time to time, from any gasometer or other source of supply.

Suitable brakes, as shown at *m*, are provided in connection with the rear wheels.

Having thus described my invention, I claim as new and desire to secure by Letters Patent—

In road-vehicles propelled by gas-engines, the frame or box K and weighted gas-receiver B, combined with the engine, substantially as shown and described.

CURTIS H. WARRINGTON.

Witnesses:
 WM. WHITEHEAD,
 MATTHEW WHITEHEAD.